(12) United States Patent
Kotikalapoodi et al.

(10) Patent No.: US 7,733,034 B2
(45) Date of Patent: Jun. 8, 2010

(54) SINGLE INDUCTOR SERIAL-PARALLEL LED DRIVER

(75) Inventors: Sridhar V. Kotikalapoodi, Santa Clara, CA (US); James Zeng, Cupertino, CA (US); Tivadar Szabo, Santa Clara, CA (US); Manisha P. Pandyn, Anaheim Hills, CA (US); Farzan Roohparvar, Monte Sereno, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/790,221

(22) Filed: Apr. 24, 2007

(65) Prior Publication Data

US 2008/0054815 A1 Mar. 6, 2008

Related U.S. Application Data

(60) Provisional application No. 60/841,543, filed on Sep. 1, 2006.

(51) Int. Cl.
*G05F 1/00* (2006.01)
*H05F 37/00* (2006.01)

(52) U.S. Cl. ...................................... 315/294; 315/312

(58) Field of Classification Search ................ 315/312, 315/185 S, 307, 291, 224, 244; 362/800, 362/543, 544, 140–142
See application file for complete search history.

(56) References Cited

U.S. PATENT DOCUMENTS 6,498,440 B2 * 12/2002 Stam et al. .................. 315/291

| | | | | |
|---|---|---|---|---|
| 6,556,067 B2 * | 4/2003 | Henry | ......................... | 327/536 |
| 6,636,104 B2 * | 10/2003 | Henry | ......................... | 327/536 |
| 6,836,157 B2 * | 12/2004 | Rader et al. | .................... | 327/66 |
| 6,847,169 B2 * | 1/2005 | Ito et al. | ......................... | 315/77 |
| 6,864,641 B2 * | 3/2005 | Dygert | ....................... | 315/216 |
| 6,897,709 B2 * | 5/2005 | Henry | ......................... | 327/536 |
| 7,459,959 B2 * | 12/2008 | Rader et al. | ................. | 327/536 |
| 2001/0043113 A1 * | 11/2001 | Hoshino et al. | ............. | 327/534 |
| 2004/0252096 A1 * | 12/2004 | Wang et al. | .................. | 345/102 |

* cited by examiner

*Primary Examiner*—Douglas W Owens
*Assistant Examiner*—Minh D A
(74) *Attorney, Agent, or Firm*—Sterne, Kessler, Goldstein & Fox, P.L.L.C.

(57) ABSTRACT

An LED driver circuit is disclosed that can drive a plurality of LED strings that are arranged in parallel, each LED string having a plurality of component LEDs that are series-connected. The LED strings can be the same type of LEDs in each string, or have different types of LEDs from one string to another. The LED driver includes a voltage control loop that dynamically regulates the output voltage across the parallel arrangement of LED strings. The output voltage is dynamically adjusted to accommodate the LED string with the largest operational voltage drop. This enables LED displays to constructed using different types of LEDs strings, but still supply the LED strings in a power efficient manner. Further, each LED string also includes its own individual current regulation loop so that the current, and therefore brightness, of each LED string can be individually adjusted.

18 Claims, 5 Drawing Sheets

SINGLE INDUCTOR SERIAL-PARALLEL LED DRIVER

CROSS REFERENCE TO RELATED APPLICATIONS

This application claims benefit of U.S. Provisional Patent Application No. 60/841,543, filed on Sep. 1, 2006, which is incorporated by reference herein in its entirety.

BACKGROUND OF THE INVENTION

1. Field of the Invention

The present invention is directed to a driver circuit for a Light Emitting Diode (LED) display system that can be used, for example, in cellular phones, PDAs, and other similar visual display units. More particularly, this invention is directed to providing driver circuitry to drive a multi-string configuration of different types of LEDs used in display systems.

2. Background Art

Modern day display systems increasingly rely upon LEDs to render a high quality visual display. The applications can include displays for cell phones, personal digital assistants (PDAs), wireless email devices, etc. It is important that the color, tone (hue), contrast, brightness, and other visual parameters remain consistent per the tolerance limits of the desired application and the specifications. To this aim, the driver circuitry used to drive any such LED display system plays a crucial role in terms of controlling the variations in the parameters and providing stability in the operation of the LED grid used in the display.

Depending on the particular application, the display system could have a submodule where a series of flash LEDs are used in parallel with regular back-lighting LEDs. The voltage and current requirements for these two types of LEDs are different and so is their operation. Also, different LEDs will have different forward voltage drops due to variations in manufacturing tolerances. This results in different output voltage requirements across the LED terminals, and therefore a different optical output for each LED if a common voltage driver is applied. Since multiple LEDs are in use in display systems, such a variation in the optical output of the LEDs leads to a degradation in the overall quality of the display images and may lead to failure in operation due to reduction in the life of an LED.

FIG. 1 shows the schematic for a conventional serial LED driver 100 that drives a single string of LEDs 110 containing 'n' number of LEDs, where 'n' is an integer. Each of the n LEDs $110_a$ to $110_n$ of the single LED string 110 is connected in a series configuration. The cathode of the last LED $110_n$ of the LED string 110 is connected to one of the two terminals of a resistive component RB 112 at a node 124. The second terminal of the resistive component RB 112 is connected to a ground 128. Since the member LEDs $110_a$-$110_n$ of the LED string 110 are connected in a series configuration, there is a voltage drop as one moves along the electrical path connecting nodes 123 and 124. As the number of LEDs increases in the LED string 110, the voltage drop across the nodes 123 and 124 increases. Accordingly, the output voltage VOUT 108 that is required to drive the single LED string 110 will increase as the number of LEDs increases. For example, assuming a voltage drop of 3-4 volts per LED, an input voltage VIN 102 of approximately 30 Volts would be needed to drive an LED string 110 with 8 LEDs. If the input voltage VIN 102 is powered from a battery, it can be as low as 2.7 Volts for a Li-ion battery and even lower for a single cell or a two cell alkaline battery, which is the common energy source for most displays used in mobile devices. Boosting from such low input voltages to 30 Volts is not very efficient and not feasible since the duty cycle required for such a process approaches 100%.

The feedback loop 122 is a voltage feedback loop that includes the control loop 117 and the FET 116 to regulate the voltage Vout 108 that supplies the LED string 110. The feedback loop 122 measures the voltage across the resistor 112 at node 124 and controls the FET 116 to drive the voltage at node 124 to equal the reference voltage 102. In other words, the control loop 117 compares voltage at node 124 to the reference voltage 102, and controls the on-off duty-cycle of the FET 116 to increase or decrease the output voltage 108 so as to drive the voltage at the node 124 to be equal to the reference voltage 102. The feedback loop 122 operates so as to time average the output voltage 108 by controlling the on-off duty-cycle of the FET 116. Finally, the Schottky diode 106 prevents any reverse current flow from the charge stored on the capacitor 114.

The conventional serial LED driver 100 is undesirable if all the member LEDs $110_1$-$110_n$ of the single LED string 110 are not of the same type. For example, if some of the LEDs are used for back-lighting and others are used for flash (flash LEDs), due to the series configuration, the same current will flow through all of them. However, flash LEDs need a higher current than that needed by LEDs for back-lighting purposes.

FIG. 2 shows another conventional LED driver 200 that is used to drive multiple parallel LED strings 210a-n that are terminated in corresponding resistors 216a-216n. These strings can be part of a main display, a sub display, a flash LED or a key pad LED, among many other things. Each of the LED strings 210 are parallel connected with each, but the LEDs in a particular string are series connected with each other. Therefore, the same current flows through each LED in a particular string. The feedback loop 122 provides a voltage feedback path to control the Vout 208, similar to that described in FIG. 1. More specifically, the control loop 117 measures the voltage at the midpoint 218 of the resistor divider 220, and controls the FET 116 to drive Vout 208 so that the midpoint 218 is equal to Vref 102.

The conventional serial LED driver 200 has poor performance if all the LED strings 210 do not have the same voltage/current characteristics. Since there is no individual current regulation for the each LED string, then the LED brightness from one string to another will vary if the LEDs are not matched. As the forward voltage of the LEDs in each of the parallel LED strings 210 changes, the current flowing in them also changes. Accordingly, there is a variation in the brightness or the optical output of the display system. The variation in forward voltage of the LEDs can be attributed, amongst many other factors, to temperature variations or manufacturing mismatches. Further, different types of LEDs require different voltage drops, for example, flash LEDs have different voltage drop requirements when compared to other LEDs.

In addition, the LED current matching in the parallel LED strings 210 is not guaranteed and depends on the forward voltages of the individual LEDs. Such a current mismatch again leads to a degradation in the output of the display. In other words, the LED driver 200 does not have any method to regulate the current in the individual LED strings, and thus falls short of attaining maximum optical output efficiency of the display system.

Additionally, the LED driver 200 is not power efficient. The output voltage VOUT 208 needs to be set to drive the LEDs with the largest forward voltage drop. If the output voltage VOUT 208 is less than the largest forward voltage drop, the whole string containing that particular LED will not light up. For example, if the maximum expected LED forward voltage drop is 4 Volts, then to drive 4 LEDs in series, the output voltage VOUT 208 needs to be set higher than 4×4 Volts=16 Volts. However, if one of the LED strings only requires 3 volts/per LED for a total of 12 Volts, then the extra 4 Volts is dissipated across one of the resistors 216a-n, which is an efficiency loss of 25% (4 Volts/16 Volts*100).

In view of the foregoing, there is a need for a low cost LED driver for display systems which overcomes the problems associated with the fluctuations in current and voltage for each of the strings of the LEDs and the concomitant fluctuations and inconsistencies in the optical output of the display systems.

SUMMARY OF THE INVENTION

According to one embodiment of the present invention, an LED driver circuit is described that can drive a plurality of LED strings that are arranged in parallel, each LED string having a plurality of component LEDs that are series-connected. The LED strings can be the same type of LEDs in each string, or have different types of LEDs from one string to another. The present invention overcomes the limitations discussed above by providing a means to control the voltage output across the parallel LED strings, and a means to control the current in each of the parallel LED strings.

The LED driver includes a voltage control loop that dynamically regulates the output voltage across the parallel arrangement of LED strings. The output voltage is dynamically adjusted to accommodate the LED string with the largest operational voltage drop, which allows for LED strings with different voltage drops to be powered in an efficient manner. Further, each LED string also includes an individual current regulation loop so that the current, and therefore optical brightness, of each LED string can be individually adjusted.

As discussed, the mechanism of voltage regulation ensures that the output voltage is boosted to a high enough value for all of the LED strings to operate properly. Further, this ensures that all the parallel LED strings have enough headroom available for proper current regulation. Since each LED string has its own current regulation loop, it allows for tight and precise current matching across all LED strings, if desired. In addition, the current in each LED string can be independently programmed and each LED string can be independently enabled or disabled. Furthermore, due to an additional degree of design freedom obtained by providing each LED string with its own current regulation mechanism, each LED string can have a different LED type from the others. Even further, the individual LEDs of a particular string could be different from each other as well. For example, some of the LEDs could be Flash LEDs while others could be regular LEDs. Additionally, for the same reason, the tolerance of the overall system to LED mismatch due to manufacturing processes also increases.

Additional features and advantages of the invention will be set forth in the description that follows, and in part will be apparent from the description. The advantages of the invention will be realized and attained by the structure and particularly pointed out in the written description and claims hereof as well as the accompanying drawings. It is to be understood that both the foregoing general description and the following detailed description are exemplary and explanatory and are intended to provide further explanation of the invention as claimed, but are not meant to limit the claimed invention in any way.

BRIEF DESCRIPTION OF THE DRAWINGS

The present invention will be readily understood by the following detailed description in conjunction with the accompanying drawings, wherein like reference numerals designate like structural elements and in which.

DETAILED DESCRIPTION OF THE EMBODIMENTS

An LED driver circuit is disclosed for an LED display system that includes the ability to control the current in each LED string and the voltage output. The present invention also provides improved power efficiency and scalability. In the following description, specific details are set forth in order to provide a thorough understanding of the present invention. It will be understood, however, to one skilled in the art, that the present invention may be practiced without some or all of these specific details. In other instances, well known process operations have not been described in detail, as they are well known to those skilled in the art.

Figure 1:
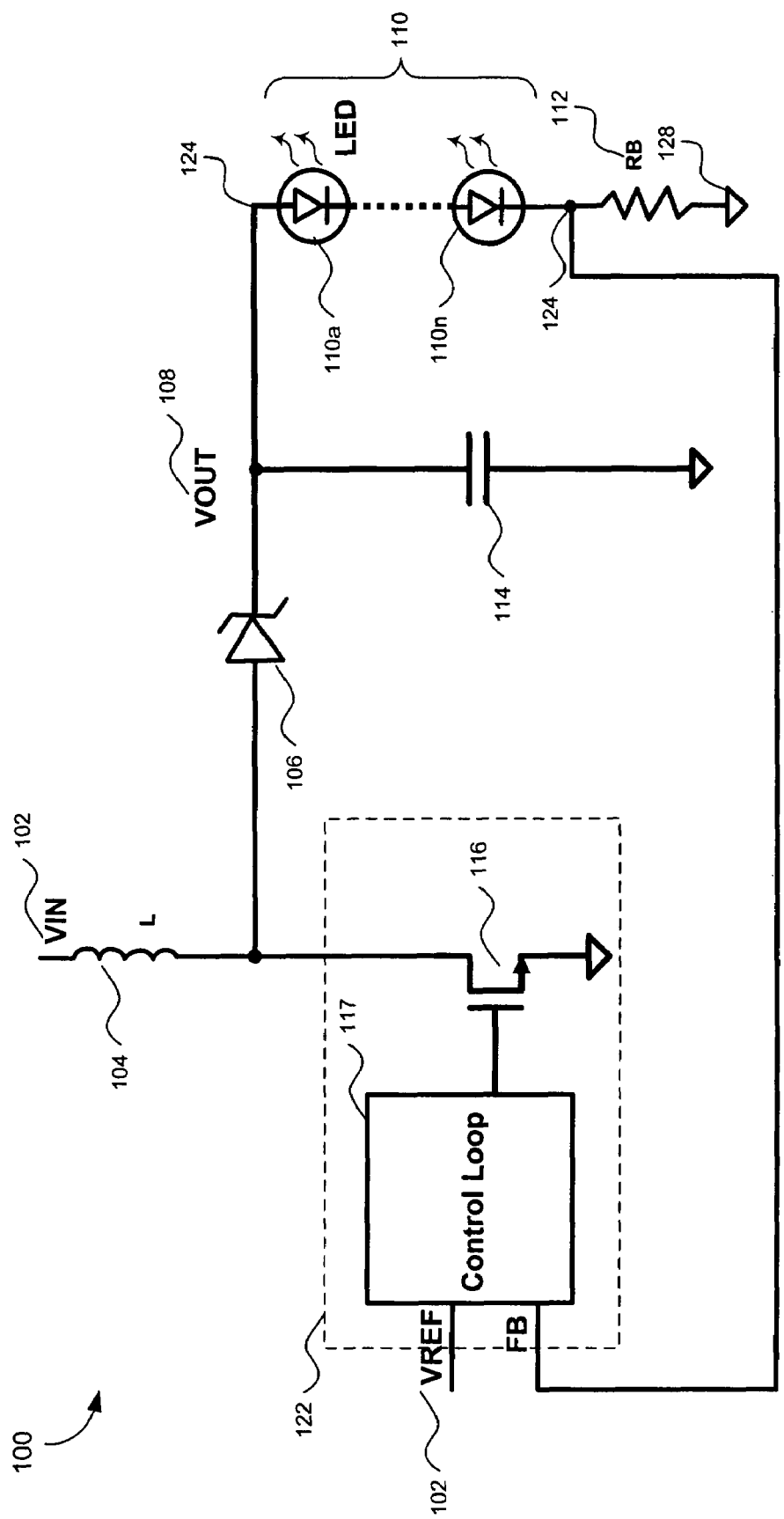
FIG. 1 illustrates a serial LED driver with a single string of LEDs connected in series.
Figure 2:
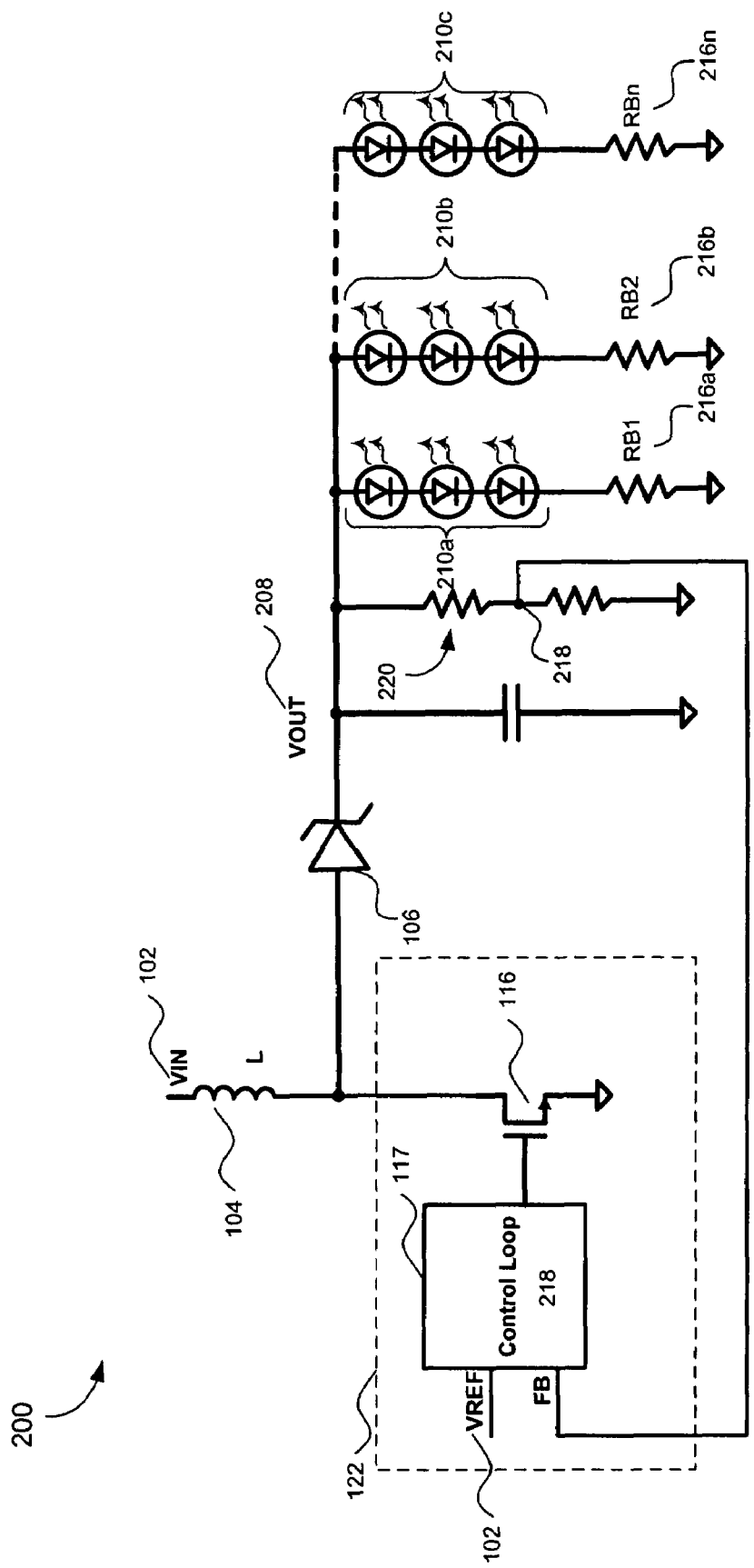
FIG. 2 illustrates an LED driver to drive a set of parallel LED strings, where the individual strings have LEDs connected in series.
Figure 3:
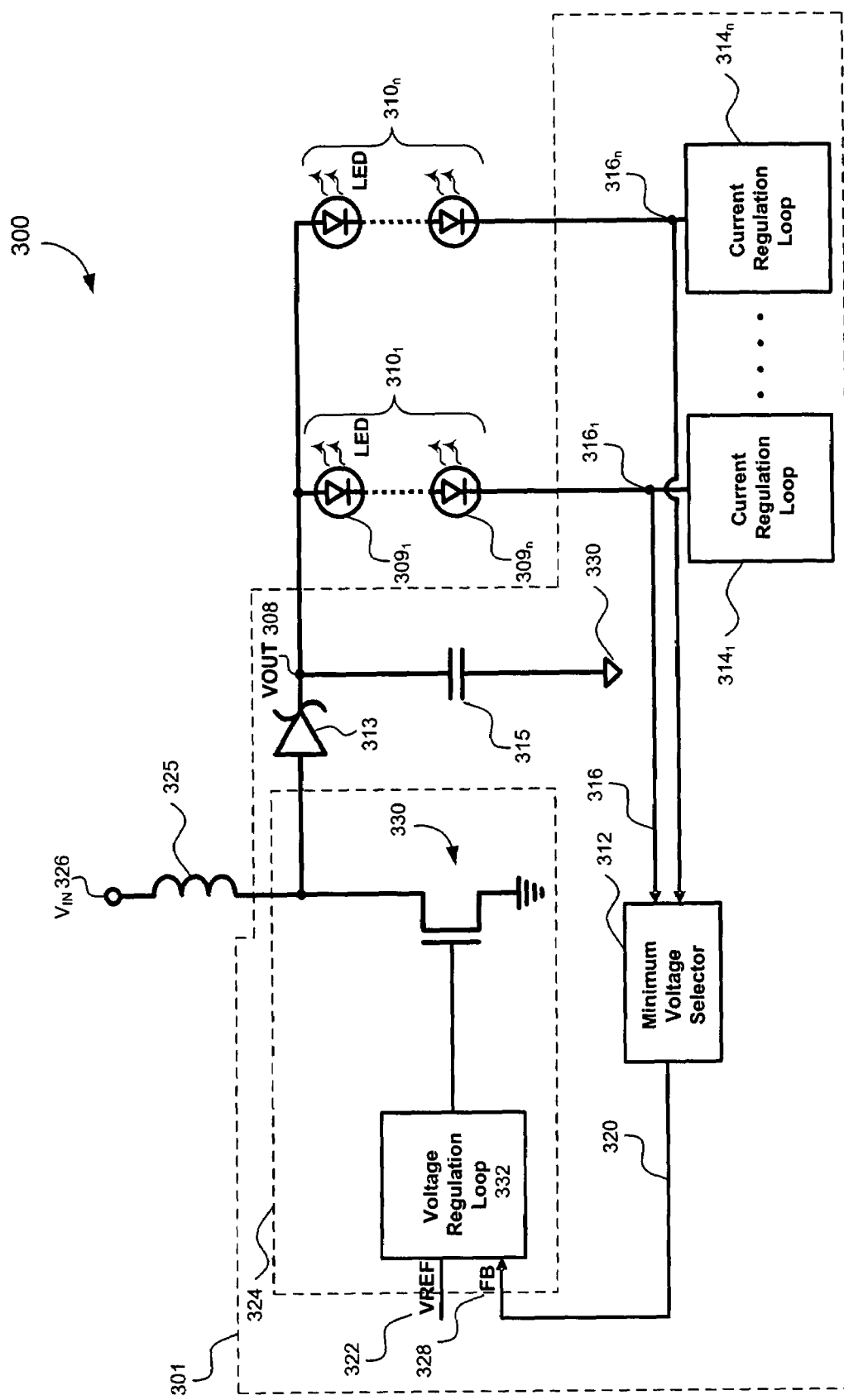
FIG. 3 illustrates an LED circuit having a set of parallel LED strings that are driven according to one embodiment of the present invention.

FIG. 3 illustrates a LED display system 300 having an LED driver 301 driving a plurality LED strings $310_1$ to $310_n$ according to embodiments of the invention, where each LED string 310 includes a plurality of LEDs 309. As shown, the LED strings $310_1$ to $310_n$ are connected in parallel with each other, but the LEDs 309 in each LED string are series connected. The total number of LEDs 309 in each individual string 310 may vary depending on the particular type of display system 300 that is intended. Further, the type of LEDs 309 may vary from string to string. For example, a first string $310_1$ may contain one or more flash LEDs, and a second string $310_2$ may contain backlighting LEDs.

The LED driver 301 includes both a voltage regulation loop 324 and current regulation loops $314_1$ to $314_n$, according to one embodiment of the present invention. As such, the voltage Vout 308 is regulated to the minimum voltage necessary to supply all of the LED strings 310. In other words, the Vout 308 is determined to meet the voltage requirement of the LED string 310 that requires the most voltage drop to be operational. Further, the current in each LED string 310 can be individually regulated by the corresponding current regulators $314_1$ to $314_n$. The LED driver 301 further includes an output voltage capacitor 315, one terminal of which is connected to a ground 330 and the other to a common node connecting the output of a voltage regulation loop 324 and anodes of the LED strings $310_1$ to $310_n$.

The input to the voltage regulation loop 324 includes an input voltage source VIN 326 via an inductor 325, a reference voltage input VREF 322, and a connection to a feedback signal 328. The feedback signal 328 originates from an output line 320 of a minimum voltage selector 312. The output voltages $316_1$ to $316_n$ from the cathodes of the last LEDs of the serial LED strings $310_1$-$310_n$ are fed into the input of the minimum voltage selector 312. The number of input lines to the minimum voltages selector 312 corresponds to the LED strings $310_1$-$310_n$. As will be discussed further below, the minimum voltage selector 312 selects the lowest of the input voltages $316_1$-$316_n$ from the ends of the LED strings 310, and then the voltage control loop 324 drives Vout 308 so that these the lowest input voltage is set approximately equal to Vref 322. This ensures that Vout 308 is sufficient to drive all of the LED strings 310 regardless of any differing voltage requirements among the LED strings 310. The current regulation loop $314_1$ is connected to the cathode of the last LED in the LED string $310_1$ to set and maintain the current in the LED string $310_1$. Similarly, the other serial LED strings $310_2$-$310_n$ have their individual current regulation loops $314_2$-$314_n$. The internal circuitry of the current regulation loops $314_1$-$314_n$ will be described in more detail with respect to FIG. 4.

The operation of the voltage control loop 324 and the minimum voltage selector 312 will now be described in more detail by means of an example. Consider two exemplary serial LED strings $310_1$ and $310_n$. Assume that the total voltage drop across serial LED string $310_1$ is 6 Volts and that across serial LED string $310_n$ is 8 Volts, due to differing LED characteristics. The minimum voltage selector 312 receives the two voltage values $316_1$ and $316_n$ corresponding to the two voltage drops. If Vout=8 volts, then voltage $316_1$=2 v and voltage $316_n$=0 v. However, the current regulation loops 314 require some minimum voltage drop to be operational. Therefore, at Vout=8 v, LED string $310_n$ may not be fully turned-on at Vout=8 v, if there is 0 volts at $316_n$. Therefore, the minimum voltage selector 312 selects the lowest voltage values from nodes $316_1$ to $316_n$ and outputs the minimum voltage to the feedback input 328. The control loop 332 then compares the minimum voltage to Vref 322, and drives the FET 330 so that the minimum voltage 316 is equal to Vref 322. Specifically, the control loop 332 increases or decreases the on-off duty-cycle of FET 330 so that Vout 308 adjusted as necessary in order for the minimum voltage 316 to be equal to Vref 322. In doing so, a minimum voltage at each of the nodes 316 is guaranteed so that the current regulation loops 314 are all operational. Further, each of the LEDs string $310_1$-$310_n$ is also guaranteed to have enough voltage drop to remain operational. In this specific example herein, Vref 322 may be set to say 0.4 v, which requires Vout=8.4 volts, so as accommodate the 8 v drop across the LED string $310_n$.

In summary, minimum voltage selector 312 and the voltage regulation loop 324 operate so that the Vout 308 to accommodate the LED string 310 with the highest voltage drop, in order to achieve dynamic voltage regulation. But Vout 308 is not set unnecessarily high, so as to minimize power requirements. Using this technique, all the parallel serial LED strings $310_1$-$310_n$ will have the sufficient voltage for the individual LEDs, which are a part of a particular string.

Figure 4:
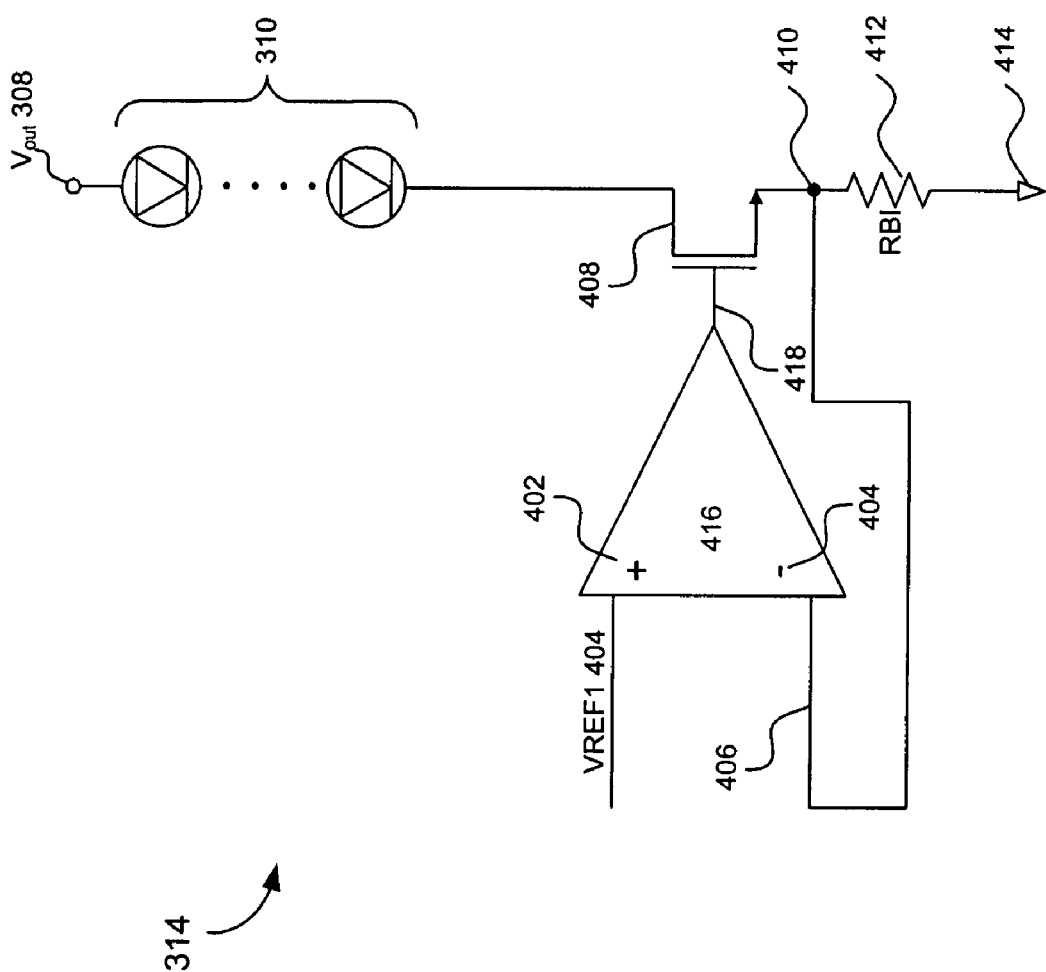
FIG. 4 illustrates main components of a current regulation loop used to control current variations in each of the parallel LED strings.

FIG. 4 illustrates one embodiment of the current regulation loops 314. Referring to FIG. 4, the current regulation loop 314 includes an operational amplifier 416 (hereinafter, referred to as "OPAMP 416") having a positive input terminal 402, a negative input terminal 404 and an output terminal 418 connected to the gate of a FET 408. Other types of transistors could be used besides FETs, including BJTs. The positive terminal 402 receives a reference voltage VREF1 404, which is determined based on the desired current that is to flow through the serial LED string 310. The negative terminal 404 is connected to the source of the FET 408 at node 410, which is connected to one terminal of a resistor 412. The second terminal of the resistor 412 is connected to a ground 414. Resistor 412 is preferably a highly accurate, stable resistor so that a voltage measurement at node 410 will be used to accurately determine the current through the LED string 310. The drain of the FET 408 is connected to the cathode of the last LED 309 of the corresponding serial LED string 310 at a node 316, as shown.

Still referring to FIG. 4, during operation, OPAMP 416 detects the voltage drop across resistor 412 by measuring the voltage at node 410 and comparing it to VREF1 404. The OPAMP 416 generates an output voltage 418 that controls the gate voltage of the FET 408, and therefore the conductivity of FET 408 based on the difference between the voltage at node 410 and the reference voltage 404. More specifically, the OPAMP 416 measures the voltage across the resistor 412 and drives the FET 408 so that the voltage across the resistor 412 substantially matches the reference voltage 404. As such, the conductivity of FET 416, and therefore the current flow through the corresponding LED string 310, can be adjusted higher or lower (i.e. regulated) by adjusting the reference voltage 404. The reference voltage VREF1 404 can be different for each of the serial LED strings $310_1$-$310_n$ so as to individually tailor the current flow through each LED string 310. In sum, the current regulation loops 314 individually regulate the current in each LED string 310, according to adjustments made to the corresponding voltage reference 404. Since the current flow controls the brightness of an LED, then adjusting the reference voltage in a particular current regulation loop also controls the brightness of the LED string 310.

Figure 5:
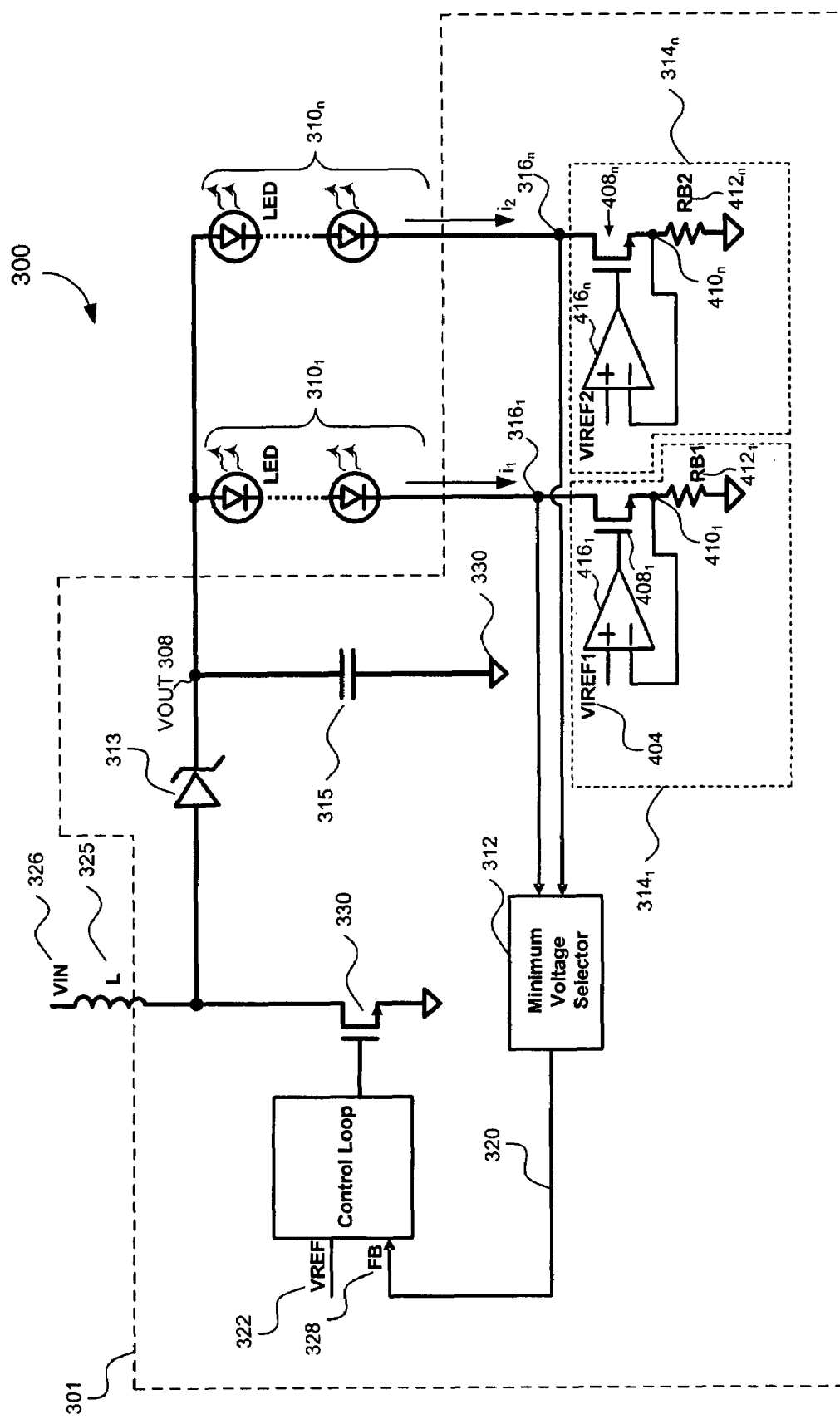
FIG. 5 further illustrates an exemplary implementation of the LED circuit according one embodiment of the present invention.

FIG. 5 further shows the LED driver 301 with the current regulation loops 314 illustrated in FIG. 4. As discussed above, the voltage regulation loop 324 provides dynamic voltage regulation by setting the output voltage Vout 308 so as to satisfy the LED string 310 with the highest voltage drop requirements. Further, the current regulation loops 314 also provide individual current regulation for each of the LED strings 310, based on the corresponding reference voltages Vref 404.

Let the currents flowing through each of the serial LED string $500_1$, $500_2$ . . . be denoted be $i_1$, $i_2$, . . . . The current $i_1$ has the value:

$$i_1 = \frac{VREF1}{RB1} \quad (1)$$

where VREF1=reference voltage VREF1 404 at the positive terminal 402 of the current regulation loop 400 and RB1=resistor 412 shown in FIG. 4. Since RB1 is a precision resistor, it is almost of a constant value. Therefore, as can be seen from equation (1), reference voltage VREF1 404 can be used to vary the value of the current $i_1$ in the first serial LED string $310_1$. The same holds true for the other serial LED strings $310_2$ to $310_n$, as was discussed in reference to FIG. 4 above.

If reference voltages in the current regulation loop are equal (i.e. $Vref_1$=$Vref_n$), then the voltage drop between Vout 308 and node $410_1$ is equal to the voltage drop between Vout 308 and node $410_n$. However, the voltage differences between the node Vout 308 and the cathode of the last LEDs 309 (node 316) of each of the serial LED strings 310 can vary depending upon the brightness requirements for each serial LED string 310. The extra or differing voltage drop between LED strings 310 is accounted for by the FETs 408 in the current loops. In other words, if the one LED string 310 requires a higher voltage drop than another LED string, the extra voltage in the LED string with the lower voltage drop is dropped across the corresponding FET 408, assuming the current loop reference voltages 404 are equal. Since different regions of the display may need different optical outputs, the flexibility in varying the output voltage VOUT 308, if needed, adds to the design features of the LED driver 301. Therefore, a stable output voltage VOUT 308 across the terminals of the output capacitor 315 is maintained while attaining different brightness levels for different LED strings. Meanwhile, the ability to adjust the current draw of each LED string through the current loop adds addition brightness adjusting, and power efficiency savings.

As is mentioned elsewhere, FIG. 5 is an exemplary embodiment of the present invention. Depending upon whether a constant (or a static) display is required or a varying (or a dynamic) display is required, different features of the claimed invention can be implemented, thereby resulting in more embodiments. Such embodiments will be apparent to those skilled in the art and can be learnt by the practice of the invention.

CONCLUSION

Example embodiments of the methods, circuits, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A light emitting diode (LED) circuit, comprising:
   a plurality of LED strings connected in parallel with each other, each LED string including a plurality of component LEDs connected in series;
   a minimum voltage selector circuit configured to select the LED string with the largest voltage drop across its terminals, and output a minimum voltage associated with said selected LED string with said largest voltage drop;
   a voltage control loop configured to receive said minimum voltage from said minimum voltage selector, said voltage control loop configured to generate a linearly-variable output voltage varied by said minimum voltage and sufficient to drive said plurality of LED strings; and
   a plurality of current regulation loops, each current regulation loop configured to determine a regulated current for a corresponding one of said plurality of LED strings,
   wherein each current regulation loop comprises
      a field effect transistor (FET) having a drain coupled to a corresponding LED string of said plurality of LED strings, and a source coupled to ground through a resistor, said FET controlling a current through said corresponding LED string, and therefore the brightness of said corresponding LED string; and
      an operational amplifier having a first input coupled to a respective dedicated reference voltage supply configured to be independently adjustable, a second input coupled to said source of said FET, and an output coupled to a gate of said FET.

2. The LED circuit of claim 1, wherein said plurality of LED strings contain one or more strings of differing LEDs.

3. The LED circuit of claim 2, wherein said plurality of current regulation loops includes:
   a first current regulation loop configured to cause a first current to flow through a first LED string of said plurality of LED strings; and
   a second current regulation loop configured to cause a second current to flow through a second LED string of said plurality of LED strings, said second current different from said first current.

4. The LED circuit of claim 2, wherein said plurality of LED strings contain a string of flash LEDs, and a string of backlighting LEDs.

5. The LED circuit of claim 4, wherein said plurality of current regulation loops includes a first current loop configured to cause a first current to flow through said string of flash LEDs, and a second current loop configured to cause a second current to flow through said string of backlighting LEDs.

6. The LED circuit of claim 1, wherein said voltage control loop is configured to adjust said output voltage based on comparing said minimum voltage to a reference voltage.

7. The LED circuit of claim 6, wherein said voltage control loop includes:
   a control loop circuit configured to compare said minimum voltage with the reference voltage, and configured to generate an output control voltage; and
   a field effect transistor (FET) having a drain that is series connected to a voltage supply through an inductor, a source coupled to ground, and a gate controlled by said output control voltage.

8. The LED circuit of claim 7, wherein said control loop circuit is configured to generate said output control voltage sufficient to cause said minimum voltage to be approximately equal to said reference voltage.

9. The LED circuit of claim 7, wherein said output voltage for said plurality of LED strings is tapped from said drain of said FET.

10. The LED circuit of claim 1, wherein said operational amplifier is configured to drive said gate of said FET so that a source voltage of said FET substantially matches said reference voltage.

11. The LED circuit of claim 1, wherein said current through said corresponding LED string, and thereby an optical brightness of said corresponding LED string, is regulated by adjusting said reference voltage.

12. A light emitting diode (LED) circuit, comprising:
   a plurality of LED strings connected in parallel with each other, each LED string including a plurality of component LEDs connected in series;
   means for providing a linearly-variable output voltage for said plurality of LED strings, said linearly-variable output voltage varied by a voltage drop across an LED string of said plurality of LED strings having the largest voltage drop of said plurality of LED strings; and
   means for individually providing a regulated current for each of said LED strings, said regulated current for each LED string being adjustable to vary a brightness of said LED string, comprising
      a field effect transistor (FET) having a drain coupled to a corresponding LED string of said plurality of LED strings, and a source coupled to ground through a resistor, said FET controlling a current through said corresponding LED string, and therefore the brightness of said corresponding LED string; and
      an operational amplifier having a first input coupled to a respective dedicated reference voltage supply configured to be independently adjustable, a second input coupled to said source of said FET, and an output coupled to a gate of said FET.

13. The LED circuit of claim 12, wherein said means for individually providing said regulated current for each of said LED strings includes a plurality of current regulation loops corresponding to said plurality of LED strings, each current regulation loop providing a corresponding regulated current based on a voltage reference input.

14. A driver circuit for a plurality of light emitting diode (LED) strings connected in parallel with each other, each LED string including a plurality of component LEDs connected in series, comprising:
 a minimum voltage selector circuit configured to select the LED string with the largest voltage drop across its terminals, and output a minimum voltage associated with said selected LED string with said largest voltage drop;
 a voltage control loop configured to receive said minimum voltage from said minimum voltage selector, said voltage control loop configured to generate a linearly-variable output voltage sufficient to drive said plurality of LED strings and varied by said minimum voltage; and
 a plurality of current regulation loops, each current regulation loop configured to determine a regulated current for a corresponding one of said plurality of LED strings,
 wherein each current regulation loop comprises
  a field effect transistor (FET) having a drain coupled to a corresponding LED string of said plurality of LED strings, and a source coupled to ground through a resistor, said FET controlling a current through said corresponding LED string, and therefore the brightness of said corresponding LED string; and
  an operational amplifier having a first input coupled to a respective dedicated reference voltage supply configured to be independently adjustable, a second input coupled to said source of said FET, and an output coupled to a gate of said FET.

15. A light emitting diode (LED) circuit, comprising:
 a plurality of LED strings connected in parallel with each other, each LED string including a plurality of component LEDs connected in series;
 a minimum voltage selector circuit configured to select the LED string with the largest voltage drop across its terminals, and output a minimum voltage associated with said selected LED string with said largest voltage drop;
 a voltage control loop configured to receive said minimum voltage from said minimum voltage selector, said voltage control loop configured to generate an output voltage sufficient to drive said plurality of LED strings based on said minimum voltage; and
 a plurality of current regulation loops, each current regulation loop configured to determine a regulated current for a corresponding one of said plurality of LED strings,
 wherein said current regulation loops are configured to be independently adjustable by adjusting a corresponding reference voltage for each current regulation loop.

16. A visual display unit comprising the LED circuit of claim 15.

17. A driver circuit for a plurality of light emitting diode (LED) strings connected in parallel with each other, each LED string including a plurality of component LEDs connected in series, comprising:
 a minimum voltage selector circuit configured to select the LED string with the largest voltage drop across its terminals, and output a minimum voltage associated with said selected LED string with said largest voltage drop;
 a voltage control loop configured to receive said minimum voltage from said minimum voltage selector, said voltage control loop configured to generate an output voltage sufficient to drive said plurality of LED strings based on said minimum voltage; and
 a plurality of current regulation loops, each current regulation loop configured to determine a regulated current for a corresponding one of said plurality of LED strings,
 wherein said current regulation loops are configured to be independently adjustable by adjusting a corresponding reference voltage for each current regulation loop.

18. A visual display unit comprising the driver circuit of claim 17.

* * * * *